United States Patent [19]

Haley

[11] 4,090,803
[45] May 23, 1978

[54] DRILLING HEAD SYSTEM FOR I-BEAMS

[76] Inventor: Ernest K. Haley, 1210 Old Cannons La., Louisville, Ky. 40205

[21] Appl. No.: 773,238

[22] Filed: Mar. 1, 1977

[51] Int. Cl.$^2$ .................................................. B23B 39/16
[52] U.S. Cl. ........................................ 408/12; 408/42; 408/46; 408/52; 408/103
[58] Field of Search .................. 408/42, 46, 48, 52, 408/53, 10, 11, 12, 103, 234, 88, 99, 108

[56] References Cited

U.S. PATENT DOCUMENTS

| | | | |
|---|---|---|---|
| 1,457,387 | 6/1923 | Neitzel | 408/11 |
| 2,584,456 | 2/1952 | Humphreys | 408/11 |
| 2,669,135 | 2/1954 | Moore | 408/234 |
| 3,246,544 | 4/1966 | Cooper | 408/52 X |
| 3,501,982 | 3/1970 | Haley | 408/48 |
| 3,552,264 | 1/1971 | Meinke | 408/42 X |
| 3,977,804 | 8/1976 | Kitagawa | 408/42 X |

*Primary Examiner*—Gil Weidenfeld
*Attorney, Agent, or Firm*—David H. Semmes

[57] ABSTRACT

A drilling head system for use in simultaneous drilling of a plurality of holes in an I-beam web. The system is characterized by its motor driven control features which permit vertical and horizontal adjustment of a drilling platform and thus the individual drilling spindles with respect to an I-beam supported securely beneath the drilling head.

4 Claims, 4 Drawing Figures

DRILLING HEAD SYSTEM FOR I-BEAMS

BACKGROUND OF THE INVENTION

1. Field of the Invention

In steel fabrication a contemporary problem is the drilling of rivet holes in steel, I-beams, columns and the like. Conventionally, the holes are first chalk marked, tapped or punched and then individually hand drilled. This is an extremely time consuming and costly process with labor costs currently at $5.00 to $8.00 per hour. Since the holes are measured and drilled manually without especial drill supporting devices, the incidence of error in hole placement is the rule rather than the exception.

Several elaborate multiple drilling head devices have been devised for handling I-beams. However, the gigantic size of these devices and their complex drill bit adjusting mechanisms require investment in the amounts of hundreds of thousands of dollars per multiple head installation.

2. Description of the Prior Art

LASSITER 1,027,347 Class 77/24, HALEY 3,501,982 Class 77/24, HALEY 3,529,496 Class 77/24.

CROSS-REFERENCE TO RELATED APPLICATION

3. An improvement upon applicant's MULTIPLE HEAD DRILLING APPARATUS U.S. Pat. No. 3,501,982 and MLUTIPLE DRILL SPINDLE SHIFTING MECHANISM U.S. Pat. No. 3,529,496.

SUMMARY OF THE INVENTION

According to the present invention, a drilling head system is provided with a base adapted for retention of an I-beam in which plural holes are to be drilled. The base and I-beam define a drilling area. At least two vertical support post are mounted in the base, so as to support a spindle head drilling platform in superposed relationship with respect to the I-beam and drilling area. A plurality of threaded shafts extend vertically with respect to the base and in parallel relationship with the support posts. A horizontally disposed spindle head drilling platform is mounted at its sides upon the support posts and includes a plurality of apertures for the threaded shafts, such that the threaded shafts extend through the platform. A drilling spindle housing including a plurality of drilling spindles and drilling spindle drive means in horizontally and adjustably mounted upon the drilling platform, such that the drills extend downwardly into the dirlling area for engagement with the I-beam. A drilling housing horizontal adjusting drive means is supported upon the platform, so as to adjust the drilling housing laterally with respect to the I-beam and drilling area. Also, a vertical platform drive means is supported upon the housing in engagement with the threaded shafts, so as to raise and lower the drilling platform and, thus, the frilling spindle housing and spindles with respect to the drilling area and the I-beam supported therein.

Figure 1:
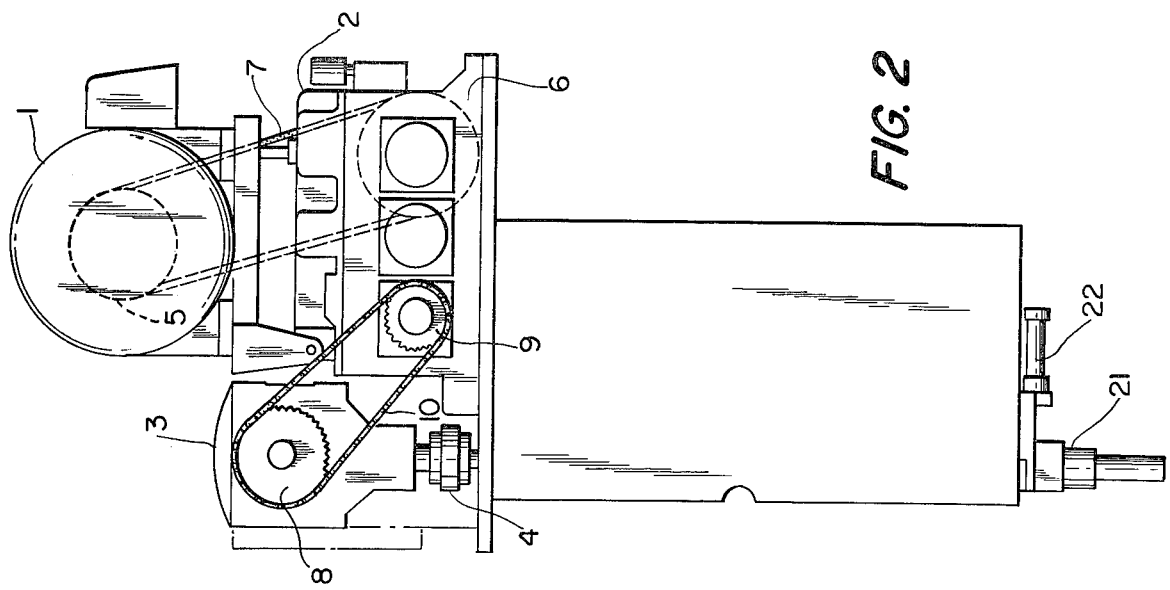
FIG. 1 is an enlarged front elevation of a multiple head drilling assembly of the type disclosed in applicant's U.S. Pat. Nos. 3,501,982 and 3,529,496 and utilizable within the present drilling head assembly.
Figure 2:
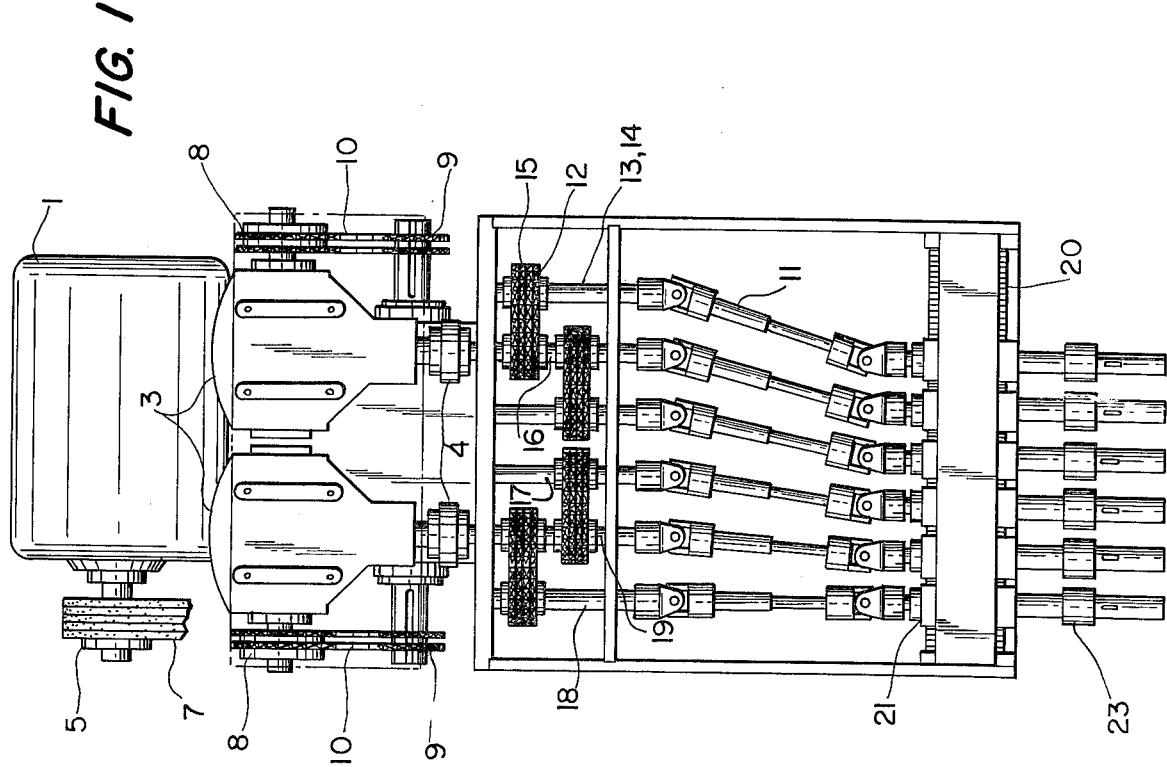
FIG. 2 is a side elevation thereof.

DESCRIPTION OF THE PREFERRED EMBODIMENTS:

In FIG. 1 a six-drill spindle head system is illustrated as comprising a 30 h.p. motor (1750 rpm) 1 and transmission 2 with suitable bevel gear drive components 3. Sprocket chain couplings 4 are employed for each bevel gear together with grooved sheaves, 5, 6 which are engaged by belt 7. Sprockets 8 and 9 are employed, respectively, on the bevel gear and the transmission and are interconnected by means or roller chain 10. Each drill has a universal joint assembly 11 connected to drive shaft 13 including a suitable spacers 14, as necessary. Roller chains 15 interconnect the individual drive shafts and the jack shafts 16 such that universal joint assembly 17 and 18 are suitably engaged. As in applicant's earlier issued patents, the individual drill chucks may be laterally adjusted with respect to each other by means of aluminum block spacers 20(21). Spindle assemblies 21 independently retain each drill as the drills engage the I-beam web, individual gag blocks 22, activated by an hydraulic cylinder engage the chuck, 23, so as to hold the drill in drilling position, as illustrated in FIG. 2.

If a 30 h.p. motor is employed, using the above-illustrated gear reduction unit, highest torque at low rpm is provided to give maximum hole size capacity at rated horse power, that is 5 horse power per spindle. The spindles may be driven by triple or quadruple roller chain through telescoping universal joints. The individual drills approach the work at a high rate of speed (13 ipm), automatically change to set feed speed when one eighth of an inch away from the work piece and, upon full penetration of the drill bit through the work, return at a high rate of speed. The variable spindle speed rpm's may be selected at approximately 200, 300, 400 and 500 from a console by push button.

Figure 3:
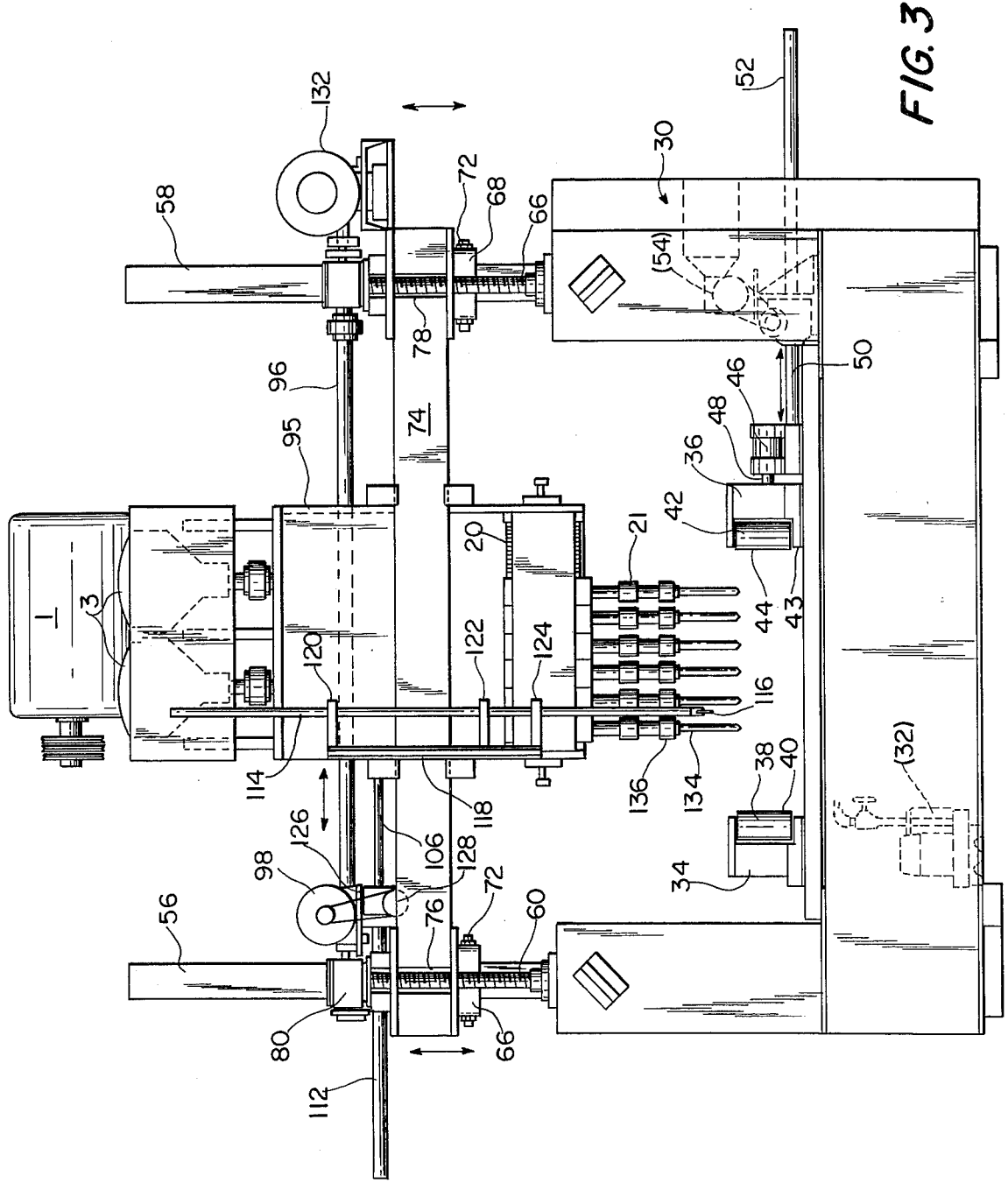
FIG. 3 is a front elevation of the present drilling head assembly, including a base defining a lower work area for support of an I-beam and a vertically and horizontally adjustable drilling head assembly of the type illustrated in FIGS. 1 and 2 and superposed with respect to the work area.

In FIG. 3 the drill system is illustrated as comprising the aforementioned six-spindle drill head for putting holes through the web of structural I-beams. This system includes a U-shaped base 30 in which a liquid coolant pump 32 (illustrated in phantom) may be positioned for access to the individual drills 134. A pair of I-beam clamp brackets 34 (stationary) and 36 (movable) are positioned within base 30. Bracket 34 mounts roller 38 such that its vertical surface 40 engages one I-beam flange and movable bracket 36 employs roller 42 such that its surface 44 engages the opposed flange of the I-beam. Bracket 36 is mounted upon threaded shaft 50 driven by motor 54 (illustrated in phantom) so as to advance bracket 36 horizontally to engage the side of the beam. These roller faced clamps position and securely hold the I-beam or structural member during drilling. Conventional position ball screws may be provided to move the clamps into position. Once set and adjusted to the size of the beam or column, bracket 36 may be quickly relaxed for advancing of the structural shape to its next drilling position or for the introduction of another beam or column of the same size. A hydraulic quick release 46, having plunger 48 retracts the roller 42 about one inch while maintaining the established position at the base of the clamp 43. Once the beam or column has been advanced to the next drilling position, roller 42 returns to the fully clamped position. The drilling machine may be aligned relative to a Datum line on conveyors.

Bracket 36 and quick relase 46 may be mounted upon threaded shaft 52 which is protected in its retractive position by means shaft housing 52, extending outwardly of base 30.

A pair of square tubes 56, 58 are mounted within base 30 as support posts for drilling platform 74. Acme thread shaft 60, 62, 64 and 66 are also mounted within base 30 so as to extend vertically through platform 74 by means of apertures 76, 78 for engagement with identical bevel gear members 80 and 90. Bevel gear system 90 is driven by motor 92 shaft 94 including fore and aft drive chains 84, 86, and transverse drive shaft 96 rotatably supported at the rear of platform 74. Activation of motor 92 and engagement of drive shaft 96 with the bevel gears 80, 90 raises or lowers platform 74, so as to vary the distance of the drills 134 with respect to the work area defined at intermediate clamps or brackets 34, 36.

Figure 4:
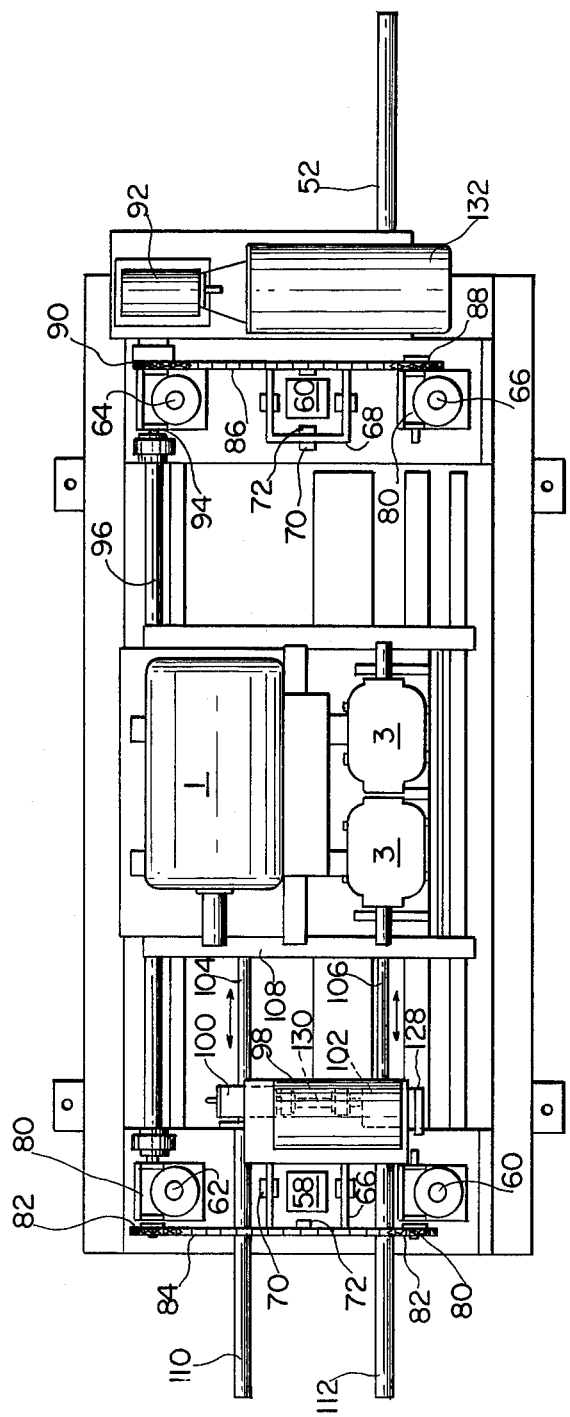
FIG. 4 is a top plan of the drilling head assembly, illustrated in FIG. 3.

As illsutrated in FIG. 4, platform 74 is rigidized in its engagement with square tubes 58 and 60, by means of housings 66 and 68, including a plurality of identical friction pads 72, engaged by means of Allenhead bolts 70, so as to tighten platform 74 with respect to the individual supports 58, 60. As wear occurs, friction pads 72 may be tightened, thereby eliminating the need for bearings and, by virtue of the accessibility of the Allenhead bolt 72, providing simple access.

The entire drilling head system, including housing 95 is slidably mounted uon carriage 74 such that a pair of threaded shafts 104, 106 extend laterally beyond tubular support 56 into respective shaft guards 110, 112. Shafts 104, 106 are engaged by means of miters 100, 102 driven by shaft 130 in turn driven by motor 198 and belt 126 which engages sprocket 128 attached to shaft 130. Motor 98 is of the variable speed type and is programmed for automatic shift of the entire head housing 95. Thus, the series of drilling of holes in the I-beam web may be laterally varied or shifted with relative ease.

As will be apparent, the drill system may comprise not only the six-spindle drilling head system for drilling of the beam web, but also a lateral four-drill system for drilling through the beam flanges. The present system is designed for web hole production and includes the capability of accepting and processing all roll structural shapes both small and large. Variable spindle speed is provided, variable feed rate is provided at 0-5 inches per minute and the lateral adjustability of the drilling housing provides for odd hole-to-hole centers and layout. The entire six-spindle drill head thus may be power side shifted to drill twelve holes in large web sections. The fast opening side clamps or brackets 34, 36 facilitate ease of handling and the drill head, itself, can be vertically raised to accommodate material up to three feet high. Water soluble coolants are employed through water jacket 1, 6 and individual drills 134. A trip rod 114 may be mounted upon the drilling housing by means of bracket 118, including lateral arms 120, 122, 124, so as to sense steel contact and kick the drills into appropriate drilling speeds, as drilling commences and is completed. The individual drill spindles 134 may be chromed and hardened and run in high quality thrust ball bearings (not illustrated). They may be easily removed and serviced and include a retractable feature allowing the operator to use one spindle or all, as he requires. The drills and spindles can be used not only for drilling, but to dimple or centerpoint for layout.

Manifestly, various means of adjustably supporting the six spindles may be employed without departing from the spirit of the invention.

I claim:

1. A drilling head system for adjustable support of a plurality of drilling spindles of the type used in drilling holes in structural members such as I-beam webs comprising:

A. A base adapted for retention of an I-beam to be drilled and defining a drilling area;
   B. At least two vertical support posts mounted in said base, so as to movably support a spindle head drilling platform in superposed relationship with respect to said base;
   C. At least four vertical threaded shafts mounted in said base and extending vertically with respect to said base and in parallel relationship with respect to said support posts; including a worm gear individually engaging each such shaft, so as to move vertically said spindle head drilling platform at its four corners;
   D. A horizontally disposed spindle head drilling platform mounted at its sides upon said support posts and including a plurality of threaded shaft apertures such that said threaded shafts may extend therethrough; said spindle head drilling platform including a plurality of friction pad housings, having individually adjustable friction pads engaging the exterior surfaces of said support posts;
   E. A drilling housing including a plurality of drilling spindles and drilling spindle drive means, said housing being horizontally, adjustably mounted upon said drilling platform and said drilling spindles extending downwardly into said drilling area; said drilling housing being mounted upon a slidable carriage and including laterally extending threaded jack shafts, together with drive means mounted upon said platform and engagable with said jack shafts so as to move horizontally said shaft and, thus, said drilling housing with respect to said platform;
   F. Drilling housing horizontal adjustable drive means supported upon said platform and engagable with said drilling housing, so as to horizontally shift said housing and said drilling spindles with respect to said work area and an I-beam supported therein; and
   G. A vertical drive means supported upon said spindle head drilling platform and engagable with said threaded shafts, so as to raise and lower said drilling platform and thus said drilling spindles with respect to said area and an I-beam supported therein.

2. A drilling head system as in claim 1, in combination with an I-beam flange locking means supported in said base.

3. A drilling head system as in claim 1, said locking clamp including a hydraulic cylinder quick-release, disengagable from the flange of said I-beam, so as to permit movement of said I-beam longitudinally within said work area and without readjustment of said locking clamp.

4. A drilling head system as in claim 3, including a vertically disposed trip rod supported upon said spindle head drilling platform and contactable with an I-beam being drilled, as a control for regulation of drilling speed.

* * * * *